United States Patent [19]

Sims et al.

[11] 4,075,600

[45] Feb. 21, 1978

[54] DUAL RESONANCE BENDER TRANSDUCER

[75] Inventors: Claude C. Sims, Orlando; Thomas H. Ensign, Winter Park, both of Fla.

[73] Assignee: The United States of America as represented by the Secretary of the Navy, Washington, D.C.

[21] Appl. No.: 694,623

[22] Filed: June 10, 1976

[51] Int. Cl.[2] .................. H04B 13/00

[52] U.S. Cl. .................. 340/9; 310/322; 310/334; 340/10; 340/14

[58] Field of Search .................. 340/8, 9, 10, 11, 12, 340/13, 14, 7; 310/8.2, 8.5

[56] References Cited

U.S. PATENT DOCUMENTS

| | | | |
|---|---|---|---|
| 3,202,962 | 8/1965 | Elston | 310/9.1 X |
| 3,249,912 | 5/1966 | Straube | 340/10 |
| 3,271,596 | 9/1966 | Brinkerhoff | 304/10 X |
| 3,321,189 | 5/1967 | Scarpa | 340/10 |
| 3,457,543 | 7/1969 | Akervold et al. | 340/10 |
| 3,708,702 | 1/1973 | Brunnert et al. | 340/10 X |
| 3,800,271 | 3/1974 | Stillman, Jr. | 340/10 |
| 3,832,762 | 9/1974 | Johnston et al. | 340/10 |
| 3,970,878 | 7/1976 | Berglund | 340/10 X |
| 3,988,620 | 10/1976 | McDavid | 310/8.6 |

*Primary Examiner*—Harold Tudor
*Attorney, Agent, or Firm*—R. S. Sciascia; Henry Hansen; William J. Iseman

[57] ABSTRACT

An acoustic transducer for simultaneously producing broadband sound sources in the conventional and overtone resonance modes. Two sets of ceramic and aluminum discs are fixed adjacent each other with the ceramic discs of each set facing one another across an air gap. By selection of respective relative diameters and thicknesses for the ceramic and aluminum discs, the transducer exhibits dual resonance output signals when excited by an input voltage.

3 Claims, 3 Drawing Figures

DUAL RESONANCE BENDER TRANSDUCER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to acoustical transducers and particularly to a transducer of the bender type which simultaneously produces dual output signals in both the conventional and overtone resonance modes.

Transducers of the bender type include a pair of spaced active components in the form of juxtaposed ceramic discs which are normally backed by rigid supporting discs such as made from aluminum and mounted so as to undergo flexure when subjected to an input voltage signal. The input voltage, when connected between electrodes of the opposed faces of each disc, gives rise to a flexure within the disc thereby generating acoustic energy outputs therefrom. In prior art arrangements, the discs, with attached supporting plates, are arranged either singly or in combination with adjacently spaced similar structure to provide singular acoustic outputs in the fundamental resonance mode. Acccordingly, in order to produce a broadband array of such arrangements a plurality of discs, each operating within a partitioned frequency segment of the array bandwidth, are interconnected in order to provide acoustic energy across the required frequency band. For large bandwidth requirements, this results in a relatively bulky, complex, and costly arrangement for the production of broadband acoustic energy.

SUMMARY OF THE INVENTION

Accordingly, it is an object of the present invention to provide a transducer of the bender type which will simultaneously operate in both fundamental and overtone resonace modes. Another object of the invention is to provide a dual resonance bender transducer which will produce acoustic energies in both a fundamental frequency band and an overtone frequency band. A further object of the present invention is to minimize the number of transducer elements utilized in a broadband transducer array. Yet another object of the present invention is to reduce the size, complexity and cost involved in the production of broadband transducer arrays, especially those arrays having marine applications.

Briefly, these and other objects are accomplished by an acoustic transducer for simultaneously producing a broadband sound source in the conventional and overtone resonance modes. Dual sets of ceramic and aluminum discs, each of said sets having the ceramic and aluminum discs bonded adjacent each other, are positioned with the ceramic discs of each of said sets facing one another across air gap formed by a sealing ring placed around the periphery of each of the aluminum discs. By selection of respective relative diameters and thicknesses for the ceramic and aluminum discs, the transducer simultaneously exhibts dual resonance output signals when excited by an input voltage.

For a better understanding of these and other aspects of the invention, reference may be made to the following detailed description taken in conjunction with the accompanying drawings.

BREIF DESCRIPTION OF THE DRAWINGS

DESCRIPTION OF THE PREFERRED EMBODIMENT

Figure 1:
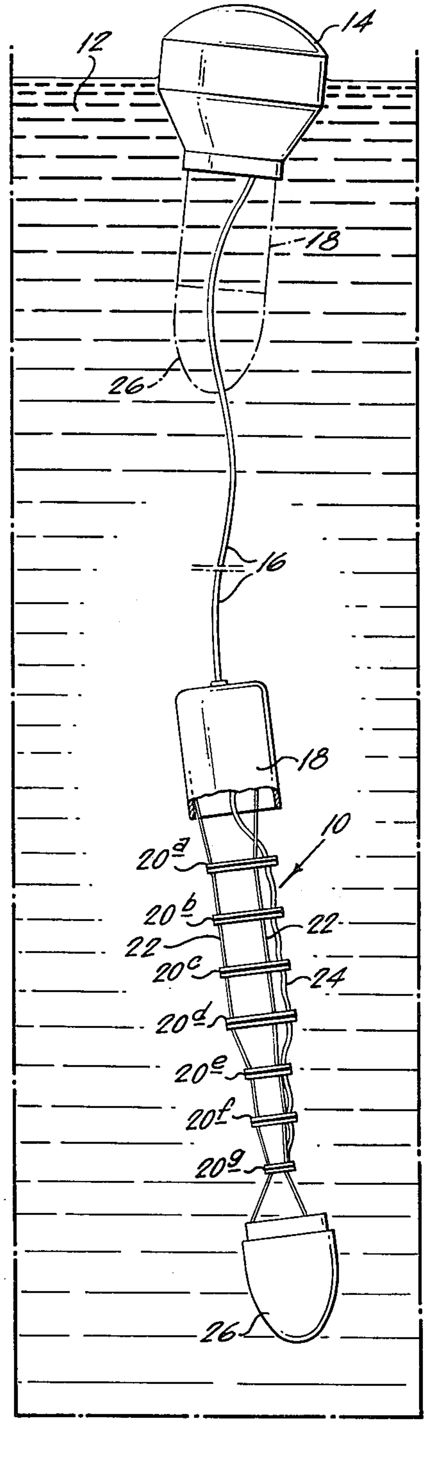
FIG. 1 is an elevation view of an acoustic array in deployment and incorporating the dual resonance transducer of the present invention.

Referring now to FIG. 1, there is shown an elevation view of a transducer array 10 deployed in a water body 12. The array 10 is supported by and suspended from the top of the water 12 surface by a float 14 and a suspension cable 16 shown fragmented to denote a length to be chosen on the basis of the required operational depth of the array. Supported by the cable 16 is an electronics package 18 which is formed in the shape of a partially filled canister. The filled part of the canister typically houses the power supply, amplifier, and tuning networks needed for the operation of the array and the remaining open space in the canister is utilized for the storage of transducers and interconnecting support cables when in a stowage position. The present embodiment illustrates a series of seven transducers 20*a–g* interconnected and spaced by a plurality of support cables 22. Driving signals and electrical power is supplied to each of the transducers 20 by a signal cable 24 originating at the electronics package 18 and branching to each of the transducers 20*a–g* in succession. Beneath the lowermost transducer 20*g* there is shown a weighting element 26 which also serves as a convex nosepiece for the electronics package 18 when the array is folded prior to deployment.

Figure 2:
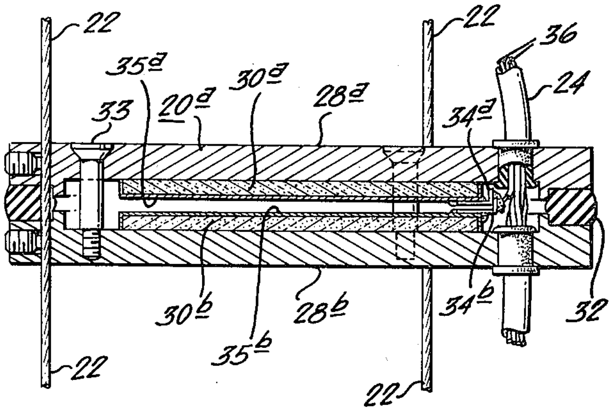
FIG. 2 is an enlarged elevation view of a section of one of the transducers made according to the present invention and which is illustrated in the view of FIG. 1.

Referring now to FIG. 2, there is shown an enlarged side elevation in section of the transducer 20*a* shown in FIG. 1. A pair of substantially rigid metallic plates 28*a*, 28*b* such as made from aluminum, for example, are shaped into a predetermined diameter and thickness which will be explained in greater detail hereinafter. Attached to one side of each of the plates 28 and concentric therewith are respective ceramic discs 30*a*, 30*b* also having a predetermined diameter and thickness relative to the diameter and thickness of each of the respective plates. The ceramic discs are each secured at one side thereof to the adjacent plate in any convenient manner such as, for example, an epoxy adhesive. A compressible, nonconductive sealing ring 32 such as made from neoprene, for example, extends around the periphery of the juxtaposed surfaces of the respective plates 28*a*, *b* and, in addition to providing a sealing effect between said plates, also causes an air space to be formed between the facing sides of the ceramic discs 30*a*, *b*. The plates 28 are sealingly compressed with the ring 32 and rigidized by a plurality of support screws 33 placed about the periphery of the plates 28*a*, *b*. The screws 33 also serve to provide an electrical conduit between each of the plates 28. The support cables 22 also provide an electrical ground path between the plates of the transducer elements within the array. A pair of electrodes 34*a*, 34*b* provide electrical connections, respectively, to ceramic discs 30*a*, 30*b* by attachment to respective silver flash coatings 35*a,* 35*b* deposited on the sides of the respective ceramic discs. Signal wires 36 are shown enclosed within the signal cable 24 with one of the wires being commonly connected to both the electrodes 34*a,* 34*b* and the others of the wires continuing through the transducer 20*a* to the other side thereof for transmitting input signals to other transducers within the array.

Figure 3:
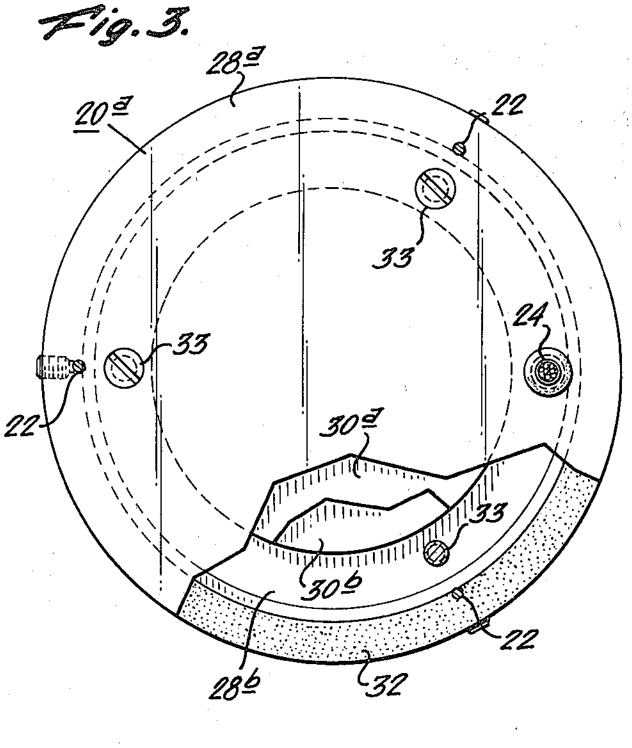
FIG. 3 is a top elevation fragmentary view of the transducer shown in FIG. 2.

Referring now to FIG. 3, there is shown a fragmented top view of the transducer shown in FIG. 2. The plate 28*a* has been fragmented to show the underlying portions of the attached ceramic disc 30*a,* a portion of the bottom plate 28*b,* and the positioning of the sealing ring 32. Also shown are the positioning of the support cables 22, the signal cable 24, and the mounting screws 33.

Referring again to FIGS. 1 and 2, the operation of the invention will now be explained with greater detail. The size of the electronics package 18 shown in FIG. 1 determines the maximum diameter of the individual transducers 20*a–g.* In a stowed position, the transducers 20 are folded inside the package 18 which is capped by the weighted nosepiece element 26. Upon deployment, the package 18 opens and the element 26 pulls the array of transducers 20 downward in a substantially vertical direction until the entire array of transducers is fully deployed with distances between each of the transducers 20 determined by the length of the support cables 22. The transducers 20 shown in FIG. 1 may all be of the double laminated dual resonance mode type shown in FIG. 2 or may vary with a corresponding mixture of conventional fundamental resonance mode transducers having a single laminate. The bandwidth desired, as well as the power output expected from the array, will determine the number and type of transducers to be employed within the array. The transducer shown in FIG. 2 is of the double laminate type because such construction allows an increase in acoustic energy output and at the same time decreases the volt-ampere requirements of support electronics, cabling and insulation. Such a double laminate is used with conventional fundamental resonance mode transducers for the same purposes. The transducer of the present invention, however, if constructed according to the dimensional constraints to be discussed hereinafter will simultaneously produce dual acoustic energy outputs having a fundamental frequency and an overtone substantially six times the fundamental frequency. The effect thereof in a multitransducer array is to reduce the number of transducers required in a broadband array due to the fact that the dual resonance mode transducer of the present invention performs double duty in providing additional bandwidth frequencies for the production of acoustic energy. Because the number of transducers are reduced, the complexity, size and cost of a broadband array are correspondingly minimized. The transducer shown in FIG. 2 comprises essentially a pair of supported composite disc sets separated by a sealing ring with each of te composite disc sets having a composite thickness consisting of the ceramic element thickness and the plate thickness. One of the first constraints placed upon the manufacture of a transducer element to be used in a marine application is the size of that element. While operating at typically low acoustic frequencies of 100 Hz. to 10 KHz, it is well known in the art that the most efficient application of a circularly formed transducer element can be achieved by maximizing the diameter of that element. Accordingly, the maximum diameter of the transducer element according to the present invention will be largely determined by the interior space diameter formed within the electronics package 18. Taking that diameter as a first limitation on the size of the bender transducer, and knowing the expected frequency response $f_r$ in the fundamental resonance mode, the composite thickness of the bender transducer may be calculated according to the equation:

$$f_r = \frac{813h}{a^2\sqrt{1 + .0285\,\frac{a}{h}}}$$

wherein $h$ = the composite bender thickness and $a$ = the plate radius. Having determined the composite thickness, the relative thickness of the ceramic disc and the metallic plate will be apportioned between the total calculated thickness. Experimentation and testing experience indicates that the most efficient thickness ratio between the ceramic disc and the corresponding adjacent plate is one half. That is, if the thickness of the ceramic disc is designated as $t_1$ and the thickness of the corresponding adjacent plate is designated as $t_2$, then $t_1/t_2 = 0.5$. The last design parameter to be determined is the relative ratio of the diameter of the ceramic disc to the diameter of the adjacent plate. Experimentation and test experience indicates that the highest efficiency and greatest overall acoustic energy output from the dual resonance transducer is achieved by selecting a ratio in the range of 0.6 – 0.8 with the optimum value being approximately 0.7. That is, if the diameter of the ceramic disc is designated as $d_1$ and the diameter of the adjacent plate is designated as $d_2$, then $d_1/d_2 = 0.7$. The ceramic disc and corresponding rigid plate are concentrically attached to one another and the mating surfaces should be planed or machined as flat as possible so as to insure as perfect a mechanical coupling as can be achieved. The ceramic may be attached to the plate in any convenient manner such as a conventional epoxy resin adhesive. The sealing ring 32 provided about the periphery of the transducer and between the inner surfaces of the plates 28*a,* 28*b* provides a water tight seal for the transducer and also causes an air space to be provided between the facing surfaces of the ceramic discs 30*a,* 30*b.* The spacing between the discs should be sufficiently large so that maximum flexure in each of the opposing sets of ceramic and plate assemblies would be permitted without contact between the ceramic discs and, accordingly, permit the full flexure of the transducer without concern for internal stresses or constraints produced by potential contact between the ceramic components. The mounting screws 33 spaced about the periphery of the plates 28 compress the transducer assembly together and maintain the spacing between the ceramic discs. The support cables 22 determine the spacing between each of the transducers 20*a–g* and also carry a ground potential electrical signal between each of the transducers. The cables are secured to each of the corresponding plates 28 of the respective transducers in any conventional manner such as, for example, set screws placed orthogonal to the direction of the cables 22 and into the outer periphery of the plates 28 so as to compress the cables 22 therein. As earlier noted, each of the ceramic discs is flashcoated with a silver surface 35*a,* 35*b* so as to provide electrical contact between the input signals produced on signal lines 36 and transmitted through the electrodes 34 to the ceramic discs 30.

Each half of the transducer (upper and lower sets) operate as mirror images of one another, so that the operational theory will be restricted to the upper set of ceramic plate assembly. The inner space between the ceramic disc and the plate, as earlier noted, must be machined to extreme flatness for maximum mechanical coupling. Therefore, any flexure waves that exist within the ceramic volume also exist on the plate side of the interface. At fundamental resonance the ceramic disc and plate have characteristics similar to a circular membrane fundamental resonance. That is, a node is formed on the outer edge and an antimode is formed in the center thereof. The overtone mode of operation according to the present invention occurs at substantially six times the frequency of the fundamental mode and is the first radially symmetric resonance mode produced after occurrence of the fundamental resonance mode. A second radially symmetric mode of resonance is predicted from test experience and this additional mode would increase the number of nodes and antinodes loci on the disc. For purposes of the present invention, the first radially symmetrical resonance mode is directly applicable to low frequency acoustic transducer arrays wherein it is desired to produce a broadband of frequencies ranging from 100 Hz. to 10 KHz. Utilizing the dual resonance mode bender transducer of the present invention, a minimum number of transducers are required to cover the foregoing noted bandwidth due to the fact that each of the transducers will simultaneously produce dual acoustic outputs at both a fundamental frequency and an overtone substantially six times the fundamental frequency. The transducers are each driven by voltage signals produced within the electronics package in any conventional manner that generates a fundamental frequency and an overtone frequency on a common signal line such as noted by line 36.

Thus it may be seen that there has been provided a novel dual resonance transducer for producing simultaneous acoustic energy outputs in both fundamental and overtone resonance modes.

Obviously, many modifications and variations of the invention are possible in light of the above teachings. For example, the ceramic disc and plate assembly constructed according to the teachings of the present invention may be utilized singly or in a bilaminer construction as shown hereinbefore. The transducer may also be utilized in an almost infinite variety of array arrangements with other dual resonance transducers or conventional mode transducers to achieve the required frequency response and acoustic output. It is therefore to be understood that within the scope of the appended claims, the invention may be practiced otherwise than as specifically described.

What is claimd is:

1. An acoustic array having a plurality of resonant frequencies within a preselected bandwidth, comprising, in combination:

a plurality of planar transducer means with selected ones being resonant at only the fundamental frequency thereof, and the others at the fundamental frequency and only one overtone frequency substantially six times the fundamental frequency, all of the fundamental and overtone frequencies being separate and discrete from each other and within said preselected bandwidth; and coupling means operatively connected to said transducer means for spacing respective ones thereof in coaxial and parallel relation;

whereby the number of incremental resonance frequencies exceed the number of said transducer means.

2. An acoustic array according to claim 1, wherein said coupling means is flexible for collapsing said array into a compact deployable configuration.

3. An acoustic array according to claim 2 wherein each of said others of said transducer means further comprises:

a pair of electrically conductive circular plates electrically connected in common to said coupling means for transmitting electrical signals therethrough;

annular support means concentrically positioned between said plates for maintaining said plates parallel and spatial to each other;

a pair of ceramic discs concentrically attached to the proximal sides of each of said plates and having a diameter substantially 0.6 to 0.8, inclusive, of the diameter of said plates, the composite thickness $h$ of each disc and plate being according to the formula $$f_r = \frac{813h}{a^2\sqrt{1 + .285\frac{a}{h}}}$$

where $f_r$ = fundamental resonance frequency, $a$ = plate radius, and the thickness of the disc is one-half the thickness of the corresponding plate; and electrical conduit means including a plurality of electrodes each connected to the other side of said discs, and conductors respectively connected to said electrodes for transmitting electrical signals therethrough.

* * * * *